US009337698B2

(12) United States Patent
Taniguchi et al.

(10) Patent No.: US 9,337,698 B2
(45) Date of Patent: May 10, 2016

(54) ROTATING ELECTRIC MACHINE

(71) Applicant: DENSO CORPORATION, Kariya, Aichi-pref. (JP)

(72) Inventors: Makoto Taniguchi, Obu (JP); Hiroshi Imai, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 151 days.

(21) Appl. No.: 14/286,540

(22) Filed: May 23, 2014

(65) Prior Publication Data

US 2014/0346907 A1    Nov. 27, 2014

(30) Foreign Application Priority Data

May 27, 2013  (JP) ................................. 2013-110827

(51) Int. Cl.
  *H02K 5/00* (2006.01)
  *H02K 5/15* (2006.01)
  *H02K 5/22* (2006.01)
  *H02K 5/04* (2006.01)

(52) U.S. Cl.
  CPC .. *H02K 5/15* (2013.01); *H02K 5/04* (2013.01); *H02K 5/22* (2013.01)

(58) Field of Classification Search
  CPC ............ H02K 5/22; H02K 5/04; H02K 15/14
  USPC .................................................... 310/89, 91
  See application file for complete search history.

(56) References Cited

U.S. PATENT DOCUMENTS

| 4,089,611 | A | * | 5/1978 | Riegler ................... F16B 19/02 403/358 |
| 4,384,224 | A |   | 5/1983 | Spitler et al. |
| 5,629,575 | A | * | 5/1997 | Cazal ....................... H02K 5/15 310/263 |
| 6,820,309 | B1| * | 11/2004 | Gersbach .................. F16G 3/08 198/844.2 |
| 2004/0090133 | A1 | * | 5/2004 | Yockey .................. H02K 1/185 310/89 |
| 2009/0133516 | A1 |   | 5/2009 | Kako et al. |

FOREIGN PATENT DOCUMENTS

| JP | 10-309056   | 11/1998 |
| JP | 2001-248408 | 9/2001  |
| JP | 2003-184711 | 7/2003  |
| JP | 2007-089375 | 4/2007  |
| JP | 2008-240619 | 10/2008 |
| JP | 2009-131061 | 6/2009  |
| JP | 2010-058575 | 3/2010  |
| JP | 2011-055573 | 3/2011  |
| JP | 2011-173495 | 9/2011  |

* cited by examiner

*Primary Examiner* — Joshua Benitez-Rosario
*Assistant Examiner* — Leda Pham
(74) *Attorney, Agent, or Firm* — Nixon & Vanderhye PC

(57) ABSTRACT

A rotating electric machine has a first frame and a second frame disposed at one axial end of a casing. The first and second frames have a first flange and a second flange, respectively, that protrude outwardly from the casing. The first and second flanges are fastened together by a through bolt. The first flange includes a recessed portion having a first curved portion, a second curved portion, and a third curved portion. A curvature radius of the third curved portion is greater than a curvature radius of the first curved portion and a curvature radius of the second curved portion such that a concentration of stress within the third curved portion that is caused by a fastening force of the through bolt may be reduced.

7 Claims, 5 Drawing Sheets

COMPARATIVE EXAMPLE

ROTATING ELECTRIC MACHINE

CROSS REFERENCE TO RELATED APPLICATION

This application is based on and incorporates herein by reference Japanese Patent Application No. 2013-110827 filed on May 27, 2013.

TECHNICAL FIELD

The present disclosure relates to a rotating electric machine.

BACKGROUND

A rotating electric machine for a vehicle has been known. Generally, a rotating electric machine has a casing that houses a stator and a rotor. The casing may be clamped between a first frame and a second frame in an axial direction. The first frame and the second frame may be fastened together by a through bolt. For example, in a starter motor disclosed in a patent document (JP 2003-184711 A), the first frame and the second frame have a first flange and a second flange, respectively. Both the first and second flanges protrude outwardly in a radial direction of a rotor and are fastened together by a through bolt.

In the starter motor of the patent document, since the head of the through bolt is fully exposed on a side surface of the first flange of the first frame that is opposite to the casing, the head of the through bolt may interfere with other components of the starter motor.

As a solution, a counterbore is formed in the first flange so that all or part of the head of the through bolt is hidden within the counterbore. As a result, interference of the head with other components can be avoided. Conventionally, the counterbore is a blind hole having a circular cross-sectional shape. Further, in a cross-sectional plane on which an axial direction of the rotor exists, a fillet curve between a bottom surface and an inner side wall of the counterbore has a curvature of constant radius.

However, as a result of the above configuration, stress may be focused locally on a portion of the counterbore due to a fastening force by the through bolt in a direction from the first flange toward the second flange. Typically, the portion to which the fastening force is focused locally is an area of a fillet curve between the bottom surface and a side wall surface of the counterbore and is positioned on a virtual circle that is concentric with a rotor and passes through an axis of the counterbore.

SUMMARY

In view of the above, an object of the present disclosure is to provide a counterbored hole that can reduce stress concentrations on a casing of the rotating electric machine.

According to an aspect of the present disclosure, a rotating electric machine includes a stator, a rotor disposed within the stator and rotatable around a rotational axis, a casing housing the stator and the rotor, a first frame disposed at one axial end of the casing in an axial direction of the rotor and having a first flange that protrudes outwardly from the casing in a radial direction of the rotor, a second frame disposed at an other axial end of the casing in the axial direction of the rotor to hold the casing together with the first frame and having a second flange that protrudes outwardly from the casing in the radial direction, and a through bolt that is inserted through a through hole provided in the first flange and is attached to the second flange.

The first flange includes a recessed portion that is recessed toward the second flange from a side surface of the first flange that is opposite to the second flange, the recessed portion having a bottom surface on which the through bolt contacts. The recessed portion includes (i) a first wall surface that is positioned on a side opposite to the rotational axis with respect to the through hole, (ii) a second wall surface that is positioned on a side closer to the rotational axis with respect to the through hole, and (iii) a pair of third wall surfaces positioned between and connecting the first wall surface and the second wall surface The first wall surface, the second wall surface, and the pair of the third wall surfaces positioned around the bottom surface of the recessed portion.

A first curved portion of a first fillet curve between the first wall surface and the bottom surface is positioned on a virtual line passing through the rotational axis and an axis of the through hole. A second curved portion of a second fillet curve between the second wall surface and the bottom surface is positioned on the virtual line. A third curved portion of a third fillet curve between each of the pair of the third wall surfaces and the bottom surface is positioned on a first virtual circle concentric with the rotational axis and passing through the axis of the through hole.

A curvature radius of the third curved portion is greater than a curvature radius of the first curved portion and a curvature radius of the second curved portion.

According to the aspect of the present disclosure, the curvature radius of the third curved portion, to which stress caused by a fastening force by the through bolt is applied, may be greater than the curvature radii of the other fillet curves of the recessed portion. Thus, it is possible to reduce the concentration of stress of the third curved portion, and thus, the first frame can be made thinner, which allows the device to be downsized.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Next, a description will be given of an embodiment of the present disclosure in reference to the drawings.

Figure 1:
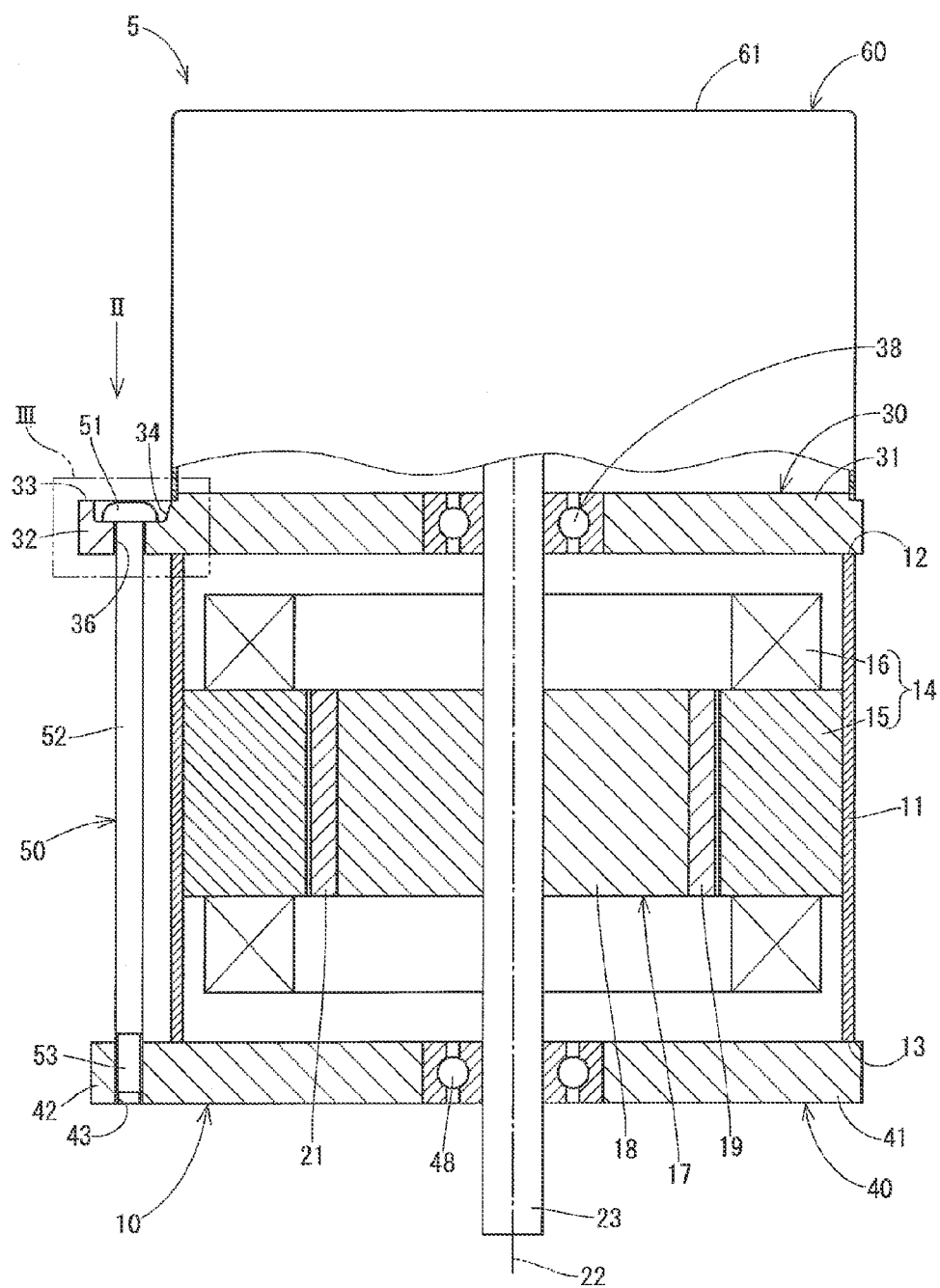
FIG. 1 is a diagram illustrating a driving device having a motor according to a first embodiment of the present disclosure.

FIG. 1 depicts the driving device 5 provided with the motor (i.e., rotating electric machine) according to the present embodiment. The driving device 5 acts as a driving source for an electric power steering system for a vehicle. First, a schematic configuration of the driving device 5 will be described with reference to FIG. 1. The driving device 5 is an electromechanical driving device integrally having a motor 10 and a controller 60 for controlling the motor 10.

The motor 10 is a three-phase brushless motor and includes a casing 11, stator 14, rotor 17, a rotary shaft 23, a first frame 30, a second frame 40, and a through bolt 50.

The casing 11 is a cylindrical member made of a soft magnetic material.

The stator 14 has a cylindrical stator core 15 fitted inside of the casing 11. A winding 16 is wound around the stator core 15.

The rotor 17 is rotatably disposed inside the stator 14 and includes a rotor core 18, a plurality of first magnetic poles 19, and a plurality of second magnetic poles 21. The rotor core 18 has a cylindrical shape and is coaxial with the stator core 15. Each first magnetic pole 19 is disposed at equal intervals in a circumferential direction of the rotor 17 and fixed to an outer wall surface of the rotor core 18. Each second magnetic pole 21 is disposed between the first magnetic poles 19 and fixed to the outer wall surface of the rotor core 18.

The rotary shaft 23 is integral with the rotor 17 and extends along a rotational axis 22 of the rotor core 18 such that the rotary shaft 23 rotates with the rotor 17.

The first frame 30 includes a first cover 31 that covers opening end 12 of the casing 11. The first frame 30 has a plurality of first flanges 32 that protrude outwardly from the first cover 31 in a radial direction of the rotor 17. The first cover 31 supports one end of the rotary shaft 23 by a bearing 38 that is disposed at a center of the first cover 31. The first flange 32 includes a recessed portion 34 and a through hole 36. The recessed portion 34 is recessed on a side surface 33 of the first flange 32 that is opposite to the second flange 42. In other words, the recessed portion 34 is recessed toward the second flange 42. The through hole 36 passes through a center of a bottom surface 35 of the recessed portion 34. In the present embodiment, three first flanges 32 are formed and arranged at equal intervals in a circumferential direction of the first frame 30.

The second frame 40 includes a second cover 41 that covers opening end 13 of the casing 11. The second frame 40 has a plurality of second flanges 42 that protrude outwardly from the second cover 41 in the radial direction of the rotor 17. The second cover 41 supports an other end of the rotary shaft 23 by a bearing 48 disposed at a center of the second cover 41. The second flange 42 has female threads 43 at a position corresponding to the through hole 36 of the first flange 32 in a circumferential direction of the second frame 40. In the present embodiment, three second flanges 42 are disposed and arranged at equal intervals in the circumferential direction of the second frame 40.

Figure 3:
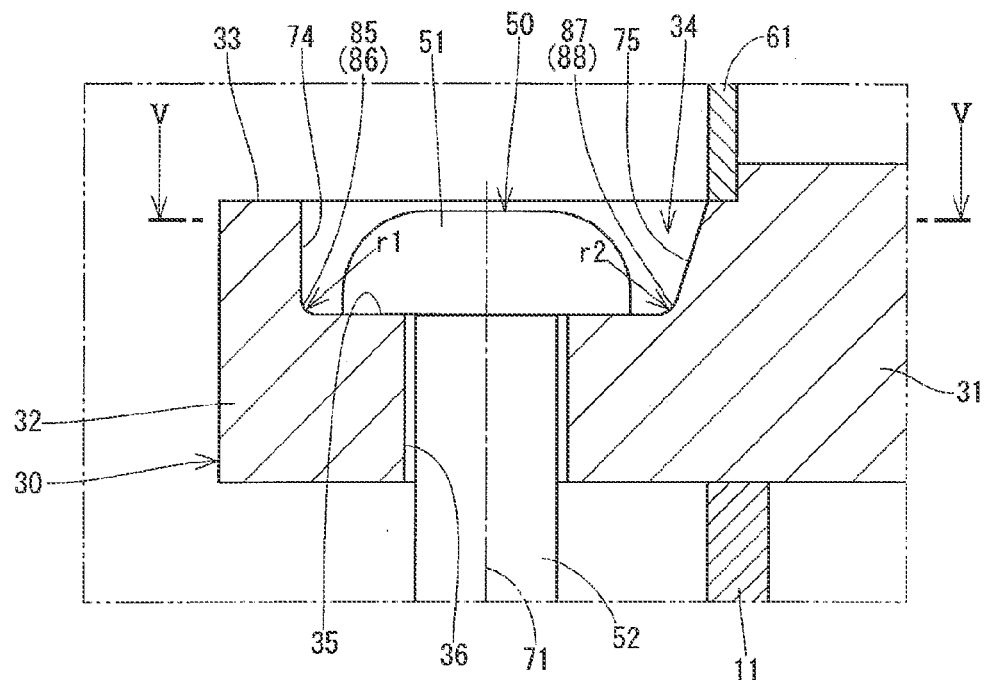
FIG. 3 is an enlarged view of a portion of the motor designated by an arrow III in FIG. 1.

The through bolt 50 includes a head 51, a shaft 52, and a screw portion 53. The through bolt 50 is inserted into the through hole 36 from the recessed portion 34 side of the first flange 32. The first flange 32 and the second flange 42 are fastened to each other by screwing the screw portion 53 into the female threads 43 of the second flange 42. As shown in FIG. 3, a bottom surface of the recessed portion 34 serves as a seat surface for the through bolt 50. In other words, the head 51 of the through bolt 50 contacts on the bottom surface 35.

The controller 60 includes electric components such as a power module and a microcomputer, both of which constitute an inverter (not shown) disposed inside a housing 61 fixed to the first frame 30. The controller 60 controls the energization applied to the winding 16 of the stator 14 based on signals input from various sensors into the controller 60. The stator 14 generates a rotation magnetic field when the winding 16 of each phase is sequentially switched. The rotor 17 rotates along with the rotary shaft 23 due to the rotation magnetic field.

The first frame 30 and the second frame 40 are made of a die-cast aluminum alloy so that both frames 30 and 40 have a high heat radiation property. Other components such as the rotor 17 and the stator 14 can be precisely held between the first frame 30 and the second frame 40. In particular, the first frame 30 includes an attachment part (not shown) to which a substrate for mounting electronic components of the controller 60 is fixed. The attachment part can be precisely held by the first frame 30 and the second frame 40.

Next, a characteristic configuration of the motor 10 will be described with reference to FIGS. 1 to 5. A straight line virtually passing through the rotational axis 22 and an axis 71 of the through hole 36 is defined as a virtual line 72. Further, a circle virtually concentric with the rotational axis 22 and passing through the axis 71 of the through hole 36 is defined as a first virtual circle 73.

As shown in FIGS. 1 to 4, a side wall surface of the recessed portion 34 that is positioned around the bottom surface 35 includes a first wall surface 74, a second wall surface 75, and a pair of third wall surfaces 76. The first wall surface 74 is positioned on a side opposite to the rotational axis 22 with respect to the through hole 36. The second wall surface 75 is positioned on a side closer to the rotational axis 22 with respect to the through hole 36. Each third wall surface 76 is positioned between the first wall surface 74 and the second wall surface 75 and connects the sides of the first wall surface 74 with the sides of the second wall surface 75.

Figure 5:
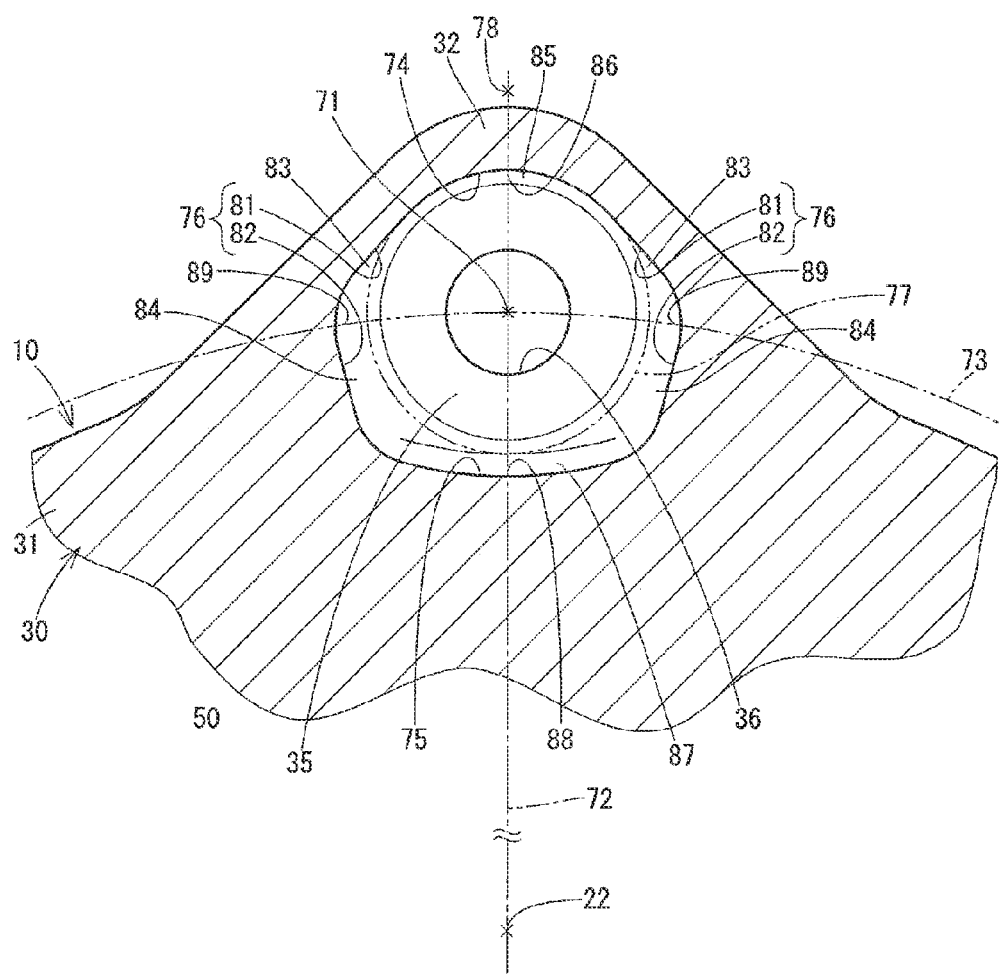
FIG. 5 is a cross-sectional view taken along line V-V in FIG. 3 without an illustration of a through bolt.

As shown in FIG. 5, when a second virtual circle 77 that is virtually concentric with the through hole 36 is defined, the first wall surface 74 has a cross-sectional shape that is perpendicular to the axis 71 and coincides with (i.e., matches or is equal to) a portion of the second virtual circle 77. The second wall surface 75 and the third wall surface 76 are positioned outside the second virtual circle 77.

As shown in FIG. 5, in a cross-sectional plane perpendicular to the axis 71, the second wall surface 75 has a curved surface having a curvature center 78 positioned at a side opposite to the rotational axis 22 with respect to the through hole 36. As shown in FIG. 3, in a cross-sectional plane on which the virtual line 72 exists, the second wall surface 75 extends away from the axis 71 in a direction from the bottom surface 35 to the side surface 33.

Figure 2:
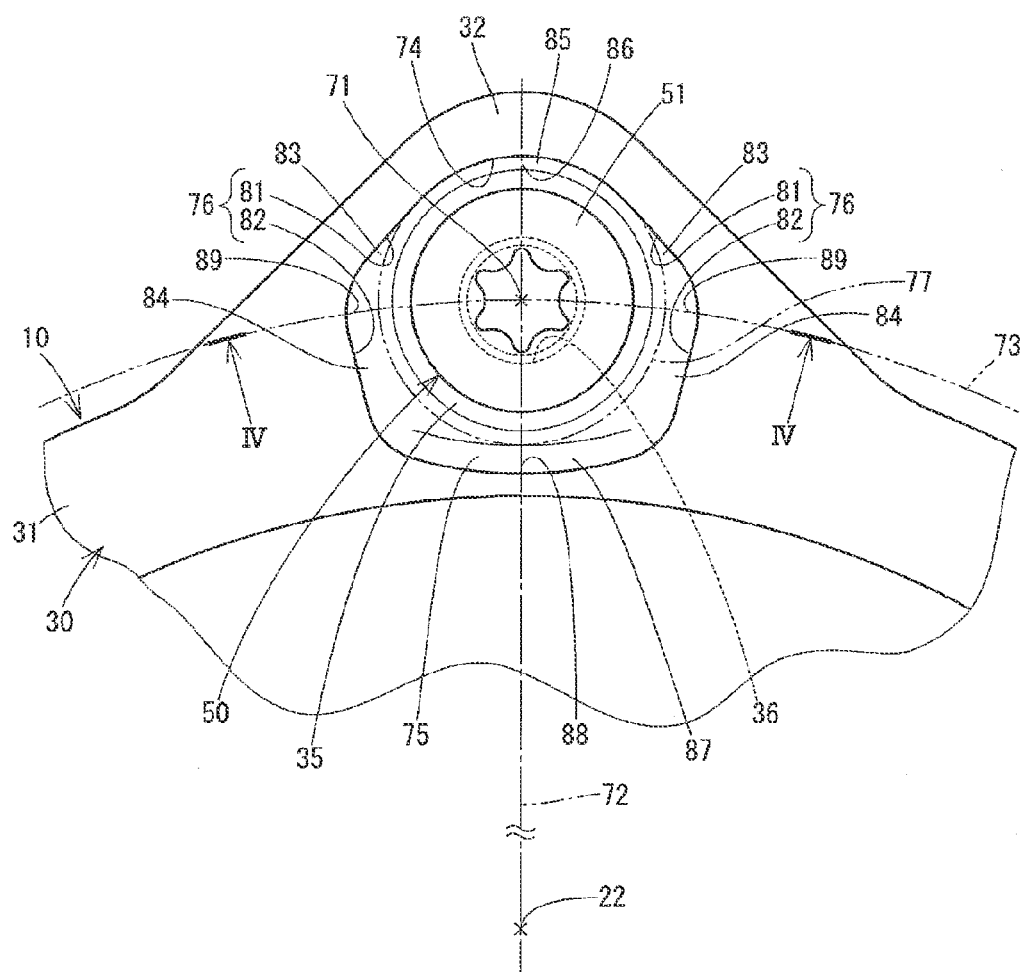
FIG. 2 is a diagram illustrating a first flange of a first frame in a view from an arrow II in FIG. 1.

As shown in FIGS. 2 and 5, the third wall surface 76 includes a first portion 81 and a second portion 82. The first portion 81 extends away from the virtual line 72 in a direction from the first wall surface 74 to the first virtual circle 73. The second portion 82 extends toward the virtual line 72 in a direction from the first virtual circle 73 to the second wall surface 75. A connecting part of the third wall surface 76 between the first portion 81 and the second portion 82 has a round shape (see FIG. 2) and a connecting part of the third wall surface 76 between the second portion 82 and the second wall surface 75 has a round shape (see FIG. 4). The third wall surface 76 is a complex surface including a curved surface and a flat surface.

Figure 6:
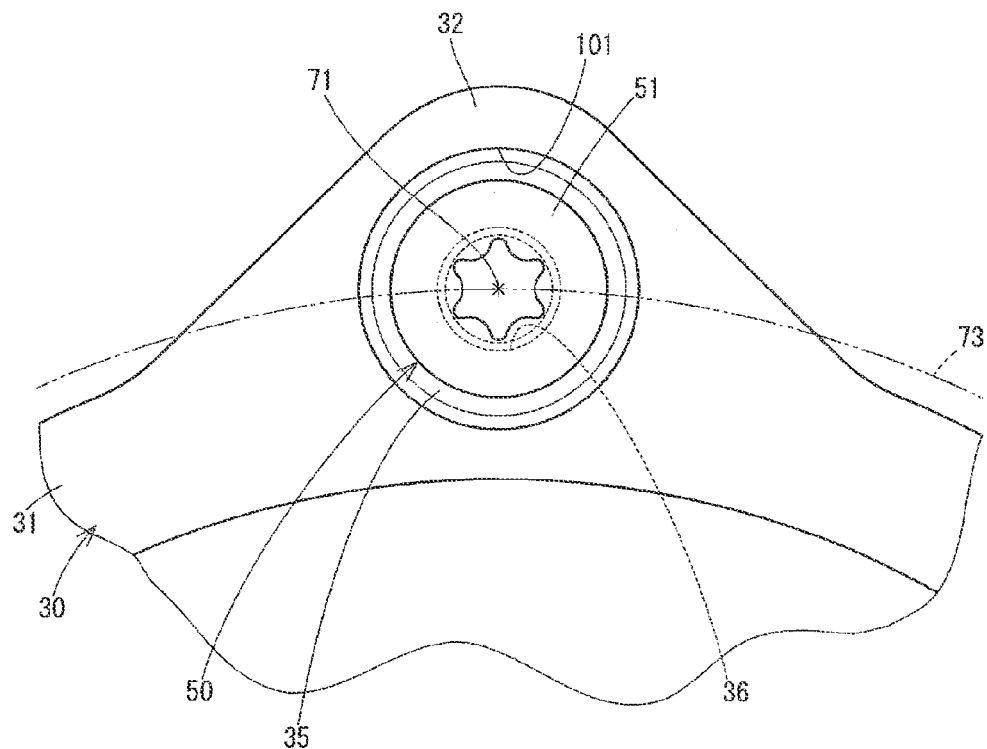
FIG. 6 is diagram illustrating a first flange of a first frame according to a first comparative example in which a counterbore having a circular cross-sectional shape is formed as a recessed portion.

According to the present embodiment having the recessed portion 34 as described above, the side wall surface of the recessed portion 34 is positioned farther away from the axis 71 (see FIG. 2) compared to the first comparative example in which a counterbore having a circular cross-sectional shape is formed as a recessed portion (see FIG. 6). More specifically, a fillet curve 83 (i.e., third fillet curve) between the first portion 81 of the third wall surface 76 and the bottom surface 35 and a fillet curve 84 (i.e., third fillet curve) between the second portion 82 of the third wall surface 76 and the bottom surface 35 are father away from the axis 71 of the through hole 36. Therefore, a curvature radius of the fillet curve 83 and a curvature radius of the fillet curve 84 can be set to be a greater value compared to those of the comparative example.

In the present embodiment, a fillet curve 85 (i.e., first fillet curve) between the first wall surface 74 and the bottom surface 35 has a round shape and a curvature radius of the fillet curve 85 is constant in a circumferential direction around the axis 71. Hereinafter, a part of the fillet curve 85 that is positioned on the virtual line 72 is referred to as a first curved portion 86.

A fillet curve 87 (i.e., second fillet curve) between the second wall surface 75 and the bottom surface 35 has a round shape and a curvature radius of the fillet curve 87 gradually increases toward both edge parts in the circumferential direction around the axis 71. More specifically, a part of the fillet curve 87 that is positioned on the virtual line 72 is defined as a second curved portion 88 and the curvature radius of the fillet curve 87 continuously increases in a direction from a center part of the second curved portion 88 to the second portion 82 of the third wall surface 76.

The fillet curve 83 between the first portion 81 of the third wall surface 76 and bottom surface 35 has a round shape and the curvature radius of the fillet curve 83 continuously increases in a direction from the first wall surface 74 to the first virtual circle 73. The curvature radius of the fillet curve 84 between the second portion 82 of the third wall surface 76 and the bottom surface 35 is constant in the circumferential direction around the axis 71.

Figure 4:
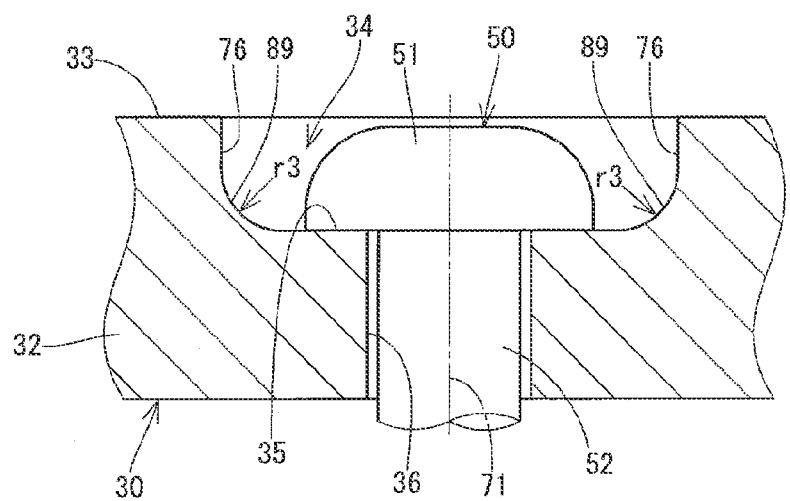
FIG. 4 is a cross-sectional view taken along line IV-IV in FIG. 2.

Hereinafter, a part of the fillet curve 83 and 84 between the third wall surface 76 and the bottom surface 35 that is positioned on the first virtual circle 73 is defined as a third curved portion 89. As shown in FIGS. 3 and 4, a curvature radius r3 of the third curved portion 89 in a cross-sectional plane, on which the axis 71 and the first virtual circle 73 exist, is greater than a curvature radius r1 of the first curved portion 86 and a curvature radius r2 of the second curved portion 88 in the cross-sectional plane, on which the virtual line 72 exists.

As described above, in the motor 10 of the present embodiment, the curvature radius r3 of the third curved portion 89, where stress is easily concentrated when a load applied to the first flange 32 due to a fastening force by the through bolt 50, is set to be greater than those of other fillet curves. Therefore, it is possible to reduce stress concentration applied to the third curved portion 89, and thus, the first frame 30 can be made as thin as possible, which enables a device size to be downsized.

Furthermore, in the present embodiment, the curvature radiuses of the fillet curves 87, 83 and 84 continuously vary in the circumferential direction around the axis 71. Therefore, the concentration stress focused locally to the recessed portion 34 can be further reduced.

In the present embodiment, the first wall surface 74 has the cross-sectional shape in the cross-sectional plane that coincides with (i.e., matches or is equal to) the portion of the second virtual circle 77. Also, the second wall surface 75 and the third wall surface 76 are positioned outside the second virtual circle 77. With this, it is possible to position the side wall of the recessed portion 34 further away from the axis 71. Further, the curvature radius of the part of the recessed portion 34, which is also further away from the axis 71, can be set to be a greater value.

In the present embodiment, the cross-sectional shape of the second wall surface 75 is a curved surface having the curvature center 78 positioned opposite to the rotational axis 22 with respect to the through hole 36. In other words, the second wall surface 75 is the curved surface protruding toward the rotational axis 22 and the curvature radius of the second wall surface 75 is greater than a radius of the second virtual circle 77. Therefore, compared to a comparative second surface that protrudes toward the through hole 36, the stress concentration at the second curved portion 88 can be reduced.

In the present embodiment, the third wall surface 76 includes the first portion 81 that gradually extends away from the virtual line 72 in the direction from the first wall surface 74 to the first virtual circle 73. Also, the second portion 82 gradually extends toward the virtual line 72 in the direction from the first virtual circle 73 to the second wall surface 75. With this, the side wall surface of the recessed portion 34 can be positioned away from the axis 71. Further, the curvature radius of the part of the recessed portion 34, which is also further away from the axis 71, can be set to be a greater value.

In the present embodiment, the curvature radius of the fillet curve 87 gradually increases in the direction from the second curved portion 88 to the second portion 82 of the third wall surface 76 and the curvature of the fillet curve 83 gradually increases in the direction from the first wall surface 74 to the second portion 82. Thus, the stress concentration focused locally at the recessed portion 34 can be further reduced.

In the present embodiment, the second wall surface 75 extends away from the axis 71 in the direction from the bottom surface 35 to the side surface 33 in. Therefore, the stress concentration focused locally at the second curved portion 88 can be further reduced.

Modifications to the Embodiment

The curvature radius of the first wall surface or the second wall surface may not be constant.

The second wall surface may be a flat surface or a complex surface including a flat surface and a curved surface.

A cross-sectional shape of the second wall surface, on which the axis of the though hole is positioned may be parallel to the axis of the through hole.

The third wall surface may be constituted with only the curved surface. In this case, the curvature radius of the third wall surface may be either constant or non-constant. That is, the third wall surface is positioned outside the second virtual circle in a cross-sectional plane that is perpendicular to the axis of the through hole.

The position where the curvature radius of the fillet curve between the side wall surface and the bottom surface of the recessed portion becomes a maximum may be located anywhere in the fillet curve between the third wall surface and the bottom surface. In other words, the maximum curvature radius position may be located either on the third curved portion, a position close to the first wall surface with respect to the third curved portion, or a position close to the second wall surface with respect to the third curved position.

The first and the second frames may be made of materials other than aluminum alloy. The first and the second frames may be manufactured by methods other than die-casting such as cutting.

Two, four, or more of the first and second flanges may be formed. Further, each flange may be not necessarily formed at equal intervals in the circumferential direction.

The motor may be used for a device other than the electric power steering for a vehicle.

The present disclosure is not limited to the above described embodiment and various modifications may be applied within the scope of the meaning of the present disclosure.

What is claimed is:

1. A rotating electric machine comprising:
a stator;
a rotor rotatable disposed within the stator;
a casing housing the stator and the rotor;
a first frame disposed at one axial end of the casing in an axial direction of the rotor and having a first flange that protrudes outwardly from the casing in a radial direction of the rotor;
a second frame disposed at an other axial end of the casing in the axial direction of the rotor to hold the casing together with the first frame and having a second flange that protrudes outwardly from the casing in the radial direction; and
a through bolt that is inserted through a through hole provided in the first flange and is attached to the second flange, wherein:
the first flange includes a recessed portion that is recessed toward the second flange from a side surface of the first flange that is opposite to the second flange, the recessed portion having a bottom surface as a contact surface for the through bolt; and
the recessed portion includes (i) a first wall surface that is positioned on a side opposite to a rotational axis of the rotor with respect to the through hole, (ii) a second wall surface that is positioned on a side close to the rotational axis with respect to the through hole, and (iii) a pair of third wall surfaces that connects the first wall surface and the second wall surface, the first wall surface, the second wall surface, and the pair of the third wall surfaces positioned around the bottom surface of the recessed portion, wherein
a virtual line passes through the rotational axis and an axis of the through hole,
a first virtual circle is concentric with the rotational axis and passes through the axis of the thorough hole,
a first curved portion of a first fillet curve between the first wall surface and the bottom surface is positioned on the virtual line,
a second curved portion of a second fillet curve between the second wall surface and the bottom surface is positioned on the virtual line, and
a third curved portion of a third fillet curve between each of the pair of the third wall surfaces and the bottom surface is positioned on the first virtual circle, wherein
a curvature radius of the third curved portion is greater than a curvature radius of the first curved portion and a curvature radius of the second curved portion.

2. The rotating electric machine according to claim 1, wherein
a curvature radius of the first fillet curve between the first wall surface and the bottom surface, a curvature radius of the second fillet curve between the second wall surface and the bottom surface, and a curvature radius of the third fillet curve between each of the pair of the third wall surfaces and the bottom surface vary along a circumferential direction around the axis of the through hole.

3. The rotating electric machine according to claim 1, wherein
the first wall surface has a cross-sectional shape that is perpendicular to the axis of the through hole and matches a portion of a second virtual circle that is a circle virtually concentric with the through hole, and
the second wall surface and the pair of the third wall surfaces are positioned outside the second virtual circle on a cross-sectional plane that is perpendicular to the axis of the through hole.

4. The rotating electric machine according to claim 1, wherein
the second wall surface has a cross-sectional shape that is perpendicular to the axis of the through hole and forms a curved surface protruding toward the rotational axis or a flat surface.

5. The rotating electric machine according to claim 1, wherein
the third wall surface includes
a first portion extending away from the virtual line in a direction from the first wall surface to the first virtual circle, and
a second portion extending toward the virtual line in a direction from the first virtual circle to the second wall surface.

6. The rotating electric machine according to claim 5, wherein
a curvature radius of the second fillet curve between the second wall surface and the bottom surface gradually increases in a direction from the second curved portion to the second portion of the third wall surface, and
a curvature radius of a part of the third fillet curve between the first portion and the bottom surface gradually increases in a direction from the first wall surface to the second portion.

7. The rotating electric machine according to claim 1, wherein
the second wall surface gradually extends away from the axis of the through hole in a direction from the bottom surface to the side surface.

* * * * *